United States Patent  
Van Phan et al.

(10) Patent No.: US 12,143,863 B2
(45) Date of Patent: Nov. 12, 2024

(54) NETWORK ENTITIES AND METHODS FOR ON-THE-FLY MASSIVE QOS MONITORING

(71) Applicant: Nokia Technologies Oy, Espoo (FI)

(72) Inventors: Vinh Van Phan, Oulu (FI); Ling Yu, Kauniainen (FI)

(73) Assignee: Nokia Technologies Oy, Espoo (FI)

(*) Notice: Subject to any disclaimer, the term of this patent is extended or adjusted under 35 U.S.C. 154(b) by 349 days.

(21) Appl. No.: 17/619,699

(22) PCT Filed: Jun. 17, 2019

(86) PCT No.: PCT/EP2019/065870
§ 371 (c)(1),
(2) Date: Dec. 16, 2021

(87) PCT Pub. No.: WO2020/253936
PCT Pub. Date: Dec. 24, 2020

(65) Prior Publication Data
US 2022/0312275 A1  Sep. 29, 2022

(51) Int. Cl.
*H04W 28/24* (2009.01)
*H04W 24/02* (2009.01)
(Continued)

(52) U.S. Cl.
CPC ........... *H04W 28/24* (2013.01); *H04W 24/02* (2013.01); *H04W 24/08* (2013.01); *H04W 76/15* (2018.02)

(58) Field of Classification Search
CPC . H04L 43/50; H04L 41/5025; H04L 41/5009; H04W 76/15; H04W 24/08; H04W 28/24; H04W 24/02; H04W 24/06
See application file for complete search history.

(56) References Cited

U.S. PATENT DOCUMENTS 7,587,358 B2 * 9/2009 Hambrecht ............ G06Q 30/08 705/37
11,259,087 B2 * 2/2022 Sharif-Ahmadi ...... H04N 7/106
(Continued)

FOREIGN PATENT DOCUMENTS

WO  2019/137612 A1  7/2019

OTHER PUBLICATIONS

International Search Report and Written Opinion dated Mar. 3, 2020 corresponding to International Patent Application No. PCT/EP2019/065870.

(Continued)

*Primary Examiner* — Brian D Nguyen
(74) *Attorney, Agent, or Firm* — Barta Jones, PLLC

(57) ABSTRACT

There is provided a first network entity, comprising a defining unit configured to define a common communication session comprising a plurality of contexts, wherein the common communication session is common to a plurality of network entities and terminal devices, a preconfiguring unit configured to preconfigure the common communication session by preconfiguring at least one context out of the plurality of contexts to be common for more than one network entity out of the plurality of network entities and for more than one terminal device out of the plurality of terminal devices, a first initiating unit configured to, based on the preconfiguration by the preconfiguring unit, initiate the preconfigured common communication session for at least one network entity out of the more than one network entities, and a triggering unit configured to, based on the initiation by the first initiating unit, trigger to initiate the preconfigured common communication session for at least one terminal device out of the more than one terminal devices.

13 Claims, 12 Drawing Sheets

(51) Int. Cl.
*H04W 24/08* (2009.01)
*H04W 76/15* (2018.01)

(56) References Cited

U.S. PATENT DOCUMENTS

| | | | |
|---|---|---|---|
| 2006/0126646 A1* | 6/2006 | Bedingfield | H04L 45/22 370/466 |
| 2014/0059388 A1* | 2/2014 | Patiev | G06F 11/0781 714/E11.029 |
| 2016/0352866 A1 | 12/2016 | Gupta et al. | |
| 2017/0272408 A1* | 9/2017 | Li | H04L 63/08 |
| 2017/0302548 A1 | 10/2017 | Sarangapani et al. | |
| 2019/0166008 A1* | 5/2019 | Gintis | H04L 43/062 |
| 2019/0182884 A1 | 6/2019 | Deenoo et al. | |
| 2019/0238345 A1* | 8/2019 | Gage | H04W 24/10 |

OTHER PUBLICATIONS

3GPP TS 22.186 V16.1.0 (Dec. 2018), Technical Specification, 3rd Generation Partnership Project; Technical Specification Group Services and System Aspects; Enhancement of 3GPP support for V2X scenarios; Stage 1 (Release 16), Dec. 2018.

3GPP TS 23.285 V16.0.0 (Mar. 2019), Technical Specification, 3rd Generation Partnership Project; Technical Specification Group Services and System Aspects; Architecture enhancements for V2X services (Release 16), Mar. 2019.

3GPP TR 23.786 V16.0.0 (Mar. 2019), Technical Report, 3rd Generation Partnership Project, Technical Specification Group Services and System Aspects; Study on architecture enhancements for the Evolved Packet System (EPS) and the 5G System (5GS) to support advanced V2X services (Release 16), Mar. 2019.

3GPP TS 23.502 V16.0.2 (Apr. 2019), Technical Specification, 3rd Generation Partnership Project; Technical Specification Group Services and System Aspects; Procedures for the 5G System; Stage 2 (Release 16), Apr. 2019.

3GPP TS 23.501 V16.0.2 (Apr. 2019), Technical Specification, 3rd Generation Partnership Project; Technical Specification Group Services and System Aspects; System Architecture for the 5G System; Stage 2 (Release 16), Apr. 2019.

3GPP TS 38.300 V15.5.0 (Mar. 2019), Technical Specification, 3rd Generation Partnership Project; Technical Specification Group Radio Access Network; NR; NR and NG-RAN Overall Description; Stage 2 (Release 15), Mar. 2019.

"3rd Generation Partnership Project; Technical Specification Group Services and System Aspects; Study on application layer support for V2X services (Release 16)", 3GPP TR 23.795, V16.1.0, Dec. 2018, pp. 1-77.

Office Action received for corresponding European Patent Application No. 19731962.7, dated Apr. 10, 2024, 5 pages.

Notice of Allowance received for corresponding European Patent Application No. 19731962.7, dated Jun. 21, 2024, 8 pages.

* cited by examiner

NETWORK ENTITIES AND METHODS FOR ON-THE-FLY MASSIVE QOS MONITORING

RELATED APPLICATION

This application was originally filed as PCT Application No. PCT/EP2019/065870, filed on Jun. 17, 2019, of which is incorporated herein by reference in its entirety.

FIELD

The present invention relates to network entities and methods for enabling on-the-fly massive Quality of Service monitoring.

BACKGROUND

The present specification generally relates to network entities and methods for enabling on-the-fly massive Quality of Service monitoring. Particularly, the present specification is targeted for 3GPP NR Ultra-Reliable Low Latency Communication (URLLC) based Industrial Internet of Things/Vehicle-to-Everything (IIoT/V2X) support in Rel'17 and beyond. However, this is referred to as an example only and the present specification is applicable also to other sessions.

Each enhanced V2X (eV2X) service, as defined in TS 22.186, may be provided with different application configurations, such as Levels of Automation (LoA), inter-vehicle gap, etc. Each application configuration may have a different Quality of Service (QoS) requirement. As a consequence, the application may have to adjust its configuration in case of a QoS change due to a new QoS that can be delivered. Considering the requirements of eV2X services, it may be important for some application(s) to be notified about a potential change in the delivered QoS in advance, in order to be able to dynamically adjust its configuration. The notification may consider locations in which a terminal device, e.g. known as a user equipment (UE), is likely to be present/driving for a given time period.

Therefore, it is an issue to study 5th Generation System (5GS) enhancements to assist application adjustments for eV2X services, according to notifications about a potential change in a delivered QoS. Such an issue applies mainly to UEs connected to a network device, e.g. known as a Next Generation NodeB (gNB), via Uu. However, it may not be excluded that concepts as taught by the present specification may be applicable to other devices (like e.g. other network entities) via other interfaces.

In this context, this at least one issue addresses aspects in view of what information is required as input to enable an assessment of a potential change in QoS in given areas by the 5GS, in view of how the 5GS may determine that a notification about a potential change in a delivered QoS is necessary, and in view of how the 5GS may communicate such information to the application in the Application Function (AF) and/or the UE.

Further, in a V2X scenario, for a given Category of Requirement (CoR), the LoA can be adjusted in the range between 1 and 5 and this adjustment in LoA may be a result of a particular network situation (e.g. congestion). The V2X application may monitor the network situation and adapt the LoA for a given CoR corresponding to a V2X scenario. This change in LoA should also be communicated to the V2X UE by a V2X application server. Thus, this aspect in which a V2X application server is capable to adjust the LoA for single or specified sets of users of the same service (e.g. platooning), by monitoring the network situation (e.g. network load) and communicating the change of LoA with a V2X UE over V1 reference point is currently not addressed in 3GPP TS 23.285.

Therefore, the ability to provide a V2X application with the 3GPP network conditions (e.g. network load) and the aspect of communicating a change of LoA to a V2X UE is highly important and requires further study.

PRIOR ART

In 3GPP SA2 TR 23.786, a solution for a QoS support for eV2X over a Uu interface is provided, addressing enhancements for QoS monitoring and control with two alternative options. Option 1 is a Radio Access Network (RAN) based multi-QoS profile, and Option 2 is a Core Network (CN) based multi-QoS profile. However, an on-the-fly massive QoS monitoring, as well as which parameters to monitor, and how to perform such QoS monitoring are neither addressed nor suggested.

Protocol Data Unit (PDU) session management procedures of a New Radio (NR) 5G system are described in 3GPP TS 23.502. FIG. 1, taken from TS 23.502, illustrates a current UE-initiated PDU session establishment. Accordingly, this shows that the signalling overhead needed for establishing a PDU session for a UE is rather substantial. Within TS 23.502, Section 4.3.1 describes on high level some essential control information to be communicated in a PDU session management. Accordingly, as defined in 23.501 3GPP SA2 TR 23.786 clause 5.6.3, considering the case of Home Routed PDU Session, the Non-Access Stratum Session Management (NAS SM) information processing by a Session Management Function (SMF) considers the following kind of NAS SM information. Namely, information that both the Visited-NAS (V-SMF) and Home-NAS (H-SMF) process: indication of the nature of the NAS SM signalling (e.g. PDU Session Establishment Request), PDU Session Type, Session Aggregate Maximum Bit Rate (Session-AMBR), UE addressing information (allocated IPv4 address, interface identifier). As well as information that is not visible to the V-SMF, only processed by the H-SMF: Session and Service Continuity (SSC) mode, Protocol Configuration Options, SM PDU Data Network (DN) Request Container, QoS Rule(s) and QoS Flow level QoS parameters if any for the QoS Flow(s) associated with the QoS rule(s).

The QoS architecture of a NR 5G system is described in 3GPP TS 23.501 (an overview is provided in 3GPP TS 38.300), showing how user data in form of QoS flows are handled within each PDU session, as illustrated in FIG. 2 (cited from TS 38.300). QoS handling in RAN, including PDU session and QoS flow setup, is captured in Annex A of TS 38.300.

Therefore, as derivable from above, it is thus an object of various exemplary embodiments to solve the problems of enabling on-the-fly massive QoS monitoring.

SUMMARY

Various exemplary embodiments aim at addressing at least part of the above issues and/or problems and drawbacks.

Various aspects of exemplary embodiments are set out in the appended claims.

According to an exemplary aspect of various exemplary embodiments, there is provided a first network entity comprising a defining unit configured to define a common communication session comprising a plurality of contexts, wherein the common communication session is common to a plurality of network entities and terminal devices, a preconfiguring unit configured to preconfigure the common communication session by preconfiguring at least one context out of the plurality of contexts to be common for more than one network entity out of the plurality of network entities and for more than one terminal device out of the plurality of terminal devices, a first initiating unit configured to, based on the preconfiguration by the preconfiguring unit, initiate the preconfigured common communication session for at least one network entity out of the more than one network entities, and a triggering unit configured to, based on the initiation by the first initiating unit, trigger to initiate the preconfigured common communication session for at least one terminal device out of the more than one terminal devices.

According to an exemplary aspect of various exemplary embodiments, there is provided a first method comprising the steps of defining a common communication session comprising a plurality of contexts, wherein the common communication session is common to a plurality of network entities and terminal devices, preconfiguring the common communication session by preconfiguring at least one context out of the plurality of contexts to be common for more than one network entity out of the plurality of network entities and for more than one terminal device out of the plurality of terminal devices, initiating, based on the preconfiguring step, the preconfigured common communication session for at least one network entity out of the more than one network entities, and triggering, based on the initiating step, to initiate the preconfigured common communication session for at least one terminal device out of the more than one terminal devices.

According to an exemplary aspect of various exemplary embodiments, there is provided a second network entity comprising an activating unit configured to activate a preconfigured common communication session based on a first initiation signaling, and a generating and distributing unit configured to, based on the activation by the activating unit, generate and distribute a test packet to at least one network entity out of a plurality of network entities and/or to at least one terminal device out of a plurality of terminal devices, and a monitoring unit configured to, based on the first initiation signaling, monitor transmittance of the test packet and response thereto in terms of at least one predetermined performance indicator out of a plurality of predetermined performance indicators.

According to an exemplary aspect of various exemplary embodiments, there is provided a second method comprising the steps of activating a preconfigured common communication session based on a first initiation signaling, generating and distributing, based on the activating step, a test packet to at least one network entity out of a plurality of network entities and/or to at least one terminal device out of a plurality of terminal devices, and monitoring, based on the first initiation signaling, transmittance of the test packet and response thereto in terms of at least one predetermined performance indicator out of a plurality of predetermined performance indicators.

According to an exemplary aspect of various exemplary embodiments, there is provided a third network entity comprising an activating unit configured to activate a preconfigured common communication session based on a first initiation signaling, a second initiating unit configured to, based on a trigger signaling, initiate the preconfigured common communication session for at least one terminal device out of a plurality of terminal devices, a generating and distributing unit configured to, based on the activation by the activating unit, generate and distribute a test packet to at least one network entity out of a plurality of network entities and/or to the at least one terminal device, and a monitoring unit configured to, based on the first initiation signaling, monitor transmittance of the test packet and response thereto in terms of at least one predetermined performance indicator out of the plurality of predetermined performance indicators.

According to an exemplary aspect of various exemplary embodiments, there is provided a third method comprising the steps of activating a preconfigured common communication session based on a first initiation signaling, initiating, based on a trigger signaling, the preconfigured common communication session for at least one terminal device out of a plurality of terminal devices, generating and distributing, based on the activating step, a test packet to at least one network entity out of a plurality of network entities and/or to the at least one terminal device, and monitoring, based on the first initiation signaling, transmittance of the test packet and response thereto in terms of at least one predetermined performance indicator out of the plurality of predetermined performance indicators.

According to an exemplary aspect of various exemplary embodiments, there is provided a terminal device comprising an activating unit configured to activate a preconfigured common communication session based on a second initiation signaling, and a generating and distributing unit configured to, based on the activation by the activating unit, generate and distribute a test packet to at least one network entity out of a plurality of network entities.

According to an exemplary aspect of various exemplary embodiments, there is provided a fourth method comprising the steps of activating a preconfigured common communication session based on a second initiation signaling, and generating and distributing, based on the activating step, a test packet to at least one network entity out of a plurality of network entities.

According to an exemplary aspect of various exemplary embodiments, there is provided a system comprising a third network entity according to at least some of the above mentioned exemplary aspects; and a plurality of terminal devices according to at least some of the above mentioned exemplary aspects, wherein at least one out of the plurality of terminal devices corresponds at least to the third network entity.

At least one or more of the above aspects enables a reliable and/or efficient on-the-fly massive QoS monitoring to thereby solve at least part of the problems and drawbacks identified in relation to the prior art.

Thus, improvement is achieved by devices (network entities, terminal devices), methods, and systems enabling/realizing reliable and/or efficient on-the-fly massive QoS monitoring. Devices, methods, and systems are not necessarily limited to on-the-fly massive QoS monitoring by preconfiguring a common PDU session, but are, generally, applicable to enable/realize reliable and/or efficient on-the-fly massive QoS monitoring based on different communication sessions.

Particularly but not exclusively, according to at least one or more of the above aspects, massive QoS monitoring is not specific to an individual UE but a certain service area consisting of one or more cells, thus involving one or more gNBs and a plurality of relevant UEs in the target service area. Relevant UEs are herein referred to as those authentic UEs in the service area, which are capable of performing the QoS monitoring of interest. This includes at least those UEs which are in a state to be subscribed to the service(s) to which the QoS monitoring of interest is relevant or applied. It is to be noted that according to various exemplary embodiments, the relevance may be controlled so as to reduce overhead for massive QoS monitoring. Further, the massive QoS monitoring is for on-the-fly adaptive service provisioning and adjustment and is therefore not necessarily limited to only some out of a plurality of active UEs, which are UEs currently operating the targeted applications and services.

Additionally, according to at least one or more of the above aspects, it is allowed to monitor deliverable QoS of a serving network on different levels of protocol stacks, RAN and E2E, in different network situations over different service areas in a flexible and effective fashion, which is required for efficient URLLC support for automation and control applications in V2X and IIoT. Various exemplary embodiments from the present specification as detailed in the following can be used as a feature of minimizing device test (MDT) as well. For examples, when considering a massive IIoT system deployed for a factory automation requiring URLLC. For a start-up of such the IIoT system, a massive QoS monitoring session may be initiated in order to reassure that all relevant UEs are working properly and required QoS levels can be met before the actual operation of the IIoT system is taking place. The required QoS levels may include, e.g.: access availability and latency on RAN level and End-to-End (E2E) level upon the state transitions of relevant UEs from IDLE/INACTIVE to ACTIVE (from RRC_IDLE/RRC_INACTIVE to RRC_CONNECTED, respectively), key performance indicators (KPIs) on reliability and latency of packet transmissions on RAN level and E2E level upon exchanging test packets between UE, gNB and UPF.

BRIEF DESCRIPTION OF THE DRAWINGS

In the following, various exemplary embodiments will be described in greater detail by way of non-limiting examples with reference to the accompanying drawings, in which.

DETAILED DESCRIPTION OF DRAWINGS AND VARIOUS EXEMPLARY EMBODIMENTS

Figure 1:
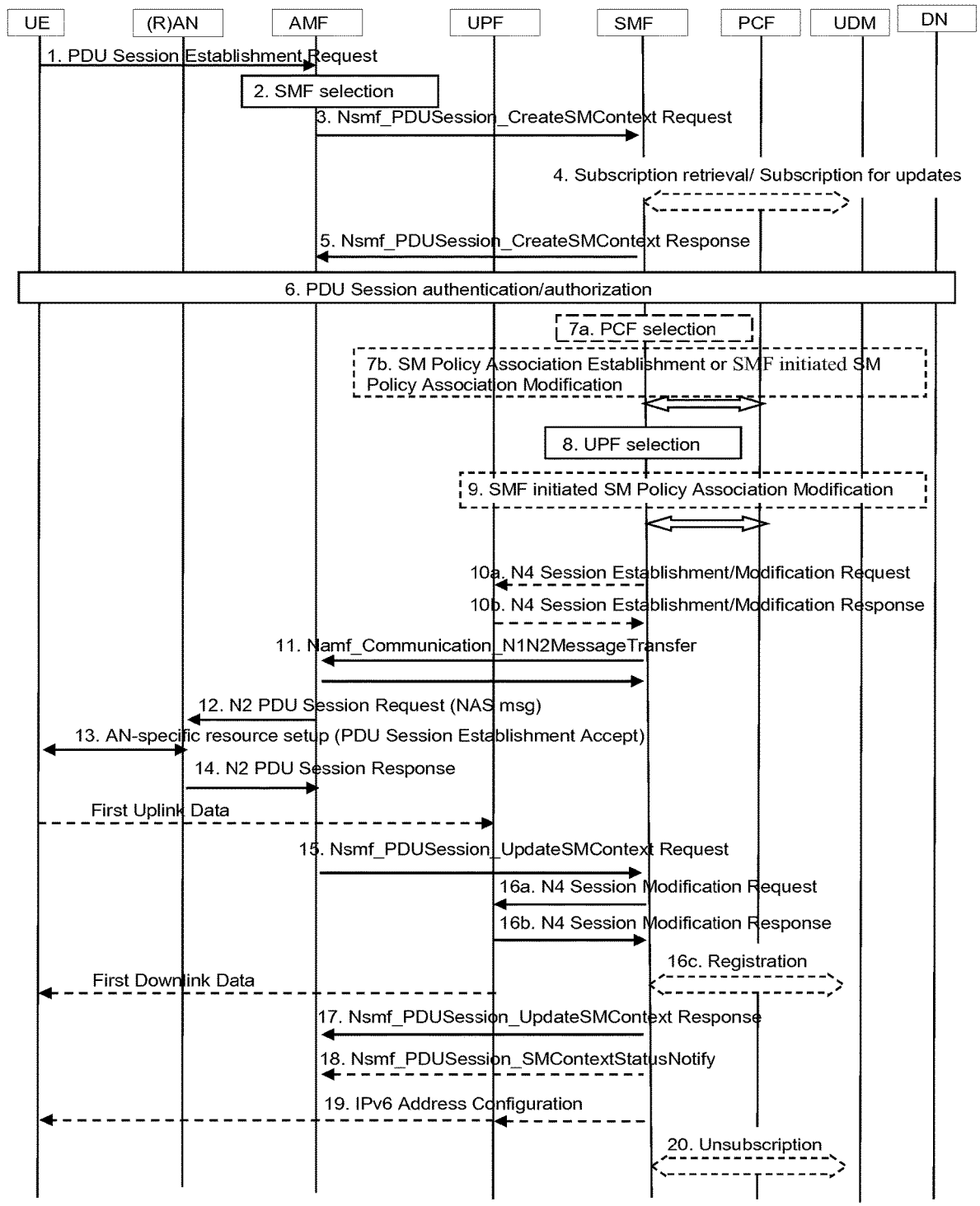
FIG. 1 shows an UE-requested PDU Session Establishment for non-roaming and roaming with local breakout according to prior art.
Figure 2:
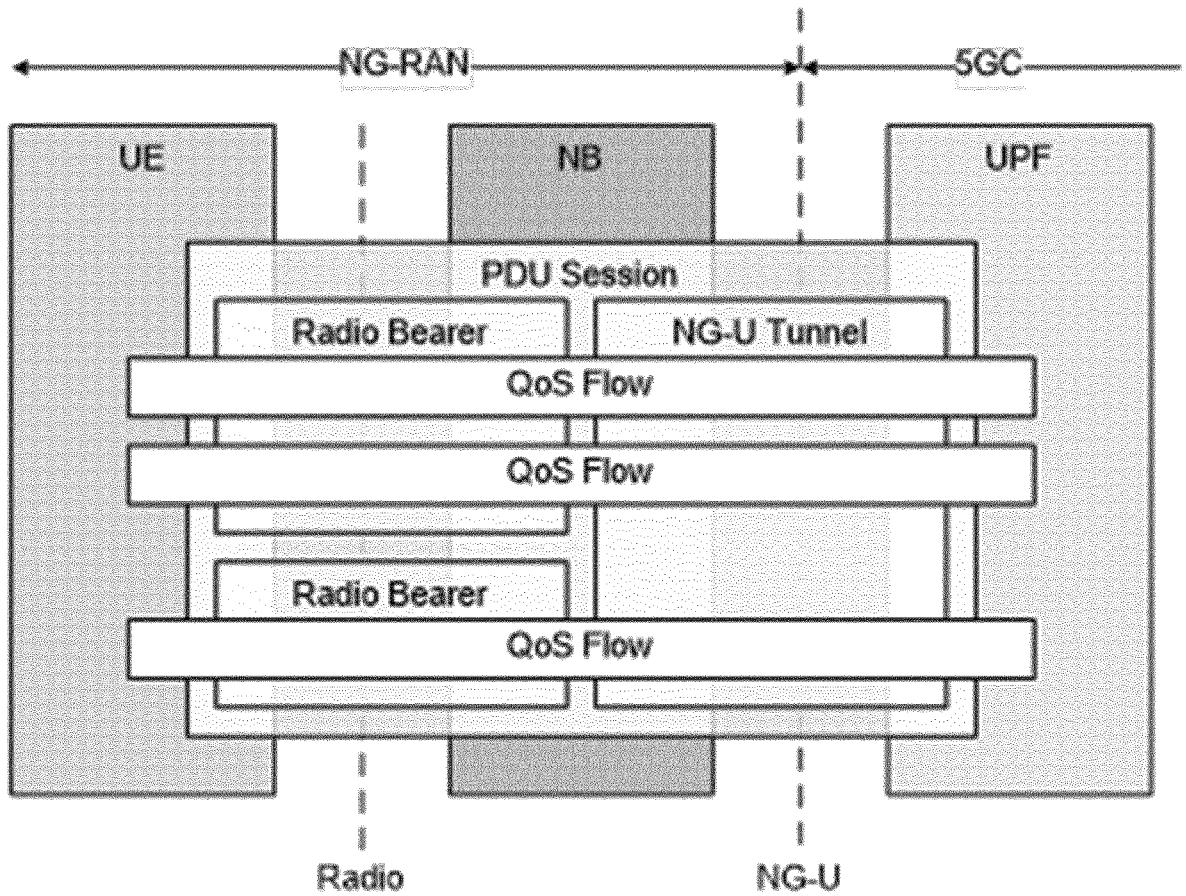
FIG. 2 shows a QoS architecture according to prior art.

Various exemplary embodiments are described herein with reference to particular non-limiting examples, as well as with reference to what are presently considered to be conceivable embodiments of various exemplary embodiments. A person skilled in the art will appreciate that the disclosure is by no means limited to these examples, and may be more broadly applied.

It is to be noted that the following description of various exemplary embodiments mainly refers to specifications being used as non-limiting examples for certain exemplary network entities and/or terminal devices. As such, the description of exemplary embodiments given herein specifically refers to terminology, which is directly related thereto. Such terminology is only used in the context of the presented non-limiting examples and does naturally not limit the disclosure in any way. Rather, any other network entity and/or terminal device, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments, in order to, basically, enable on-the-fly massive QoS monitoring, there are provided devices, methods, and systems to solve these problems.

Specifically, various exemplary embodiments relate to the need for facilitating on-the-fly monitoring of certain network situations or predetermined indicators, like e.g. KPIs, and, in particular, deliverable QoS level(s) related to some targeted application(s) and service(s) or service class(es) of V2X and the like, such as IIoT. This kind of monitoring is not specific to an individual UE but rather averaged out over a certain service area and a certain time period at the present. Such monitoring is thus referred to herein as on-the-fly massive QoS monitoring.

NR considers support of URLLC based applications and services over Uu access including remote driving and automation applications in V2X and IIoT. Important KPIs for such challenging URLLC based applications and services include E2E latency and reliability. In addition, service availability and service access latency may be of high interest as well.

The present specification provides among others an effective method to facilitate on-the-fly massive QoS monitoring for URLLC driven applications and services in V2X and IIoT. According to at least some exemplary embodiments, it is assumed that the network side performs the actual QoS monitoring for KPIs of interest including E2E latency and reliability of data packet transmissions on a targeted QoS class based on feedback from involved UEs.

The present specification according to at least some exemplary embodiments is based on the idea of allowing the CN to initiate an on-the-fly massive QoS monitoring session of some E2E KPI(s) for URLLC support over Uu, based on using a common PDU session which is introduced specifically for such massive QoS monitoring considered herein. Thus, further from the current PDU session in NR (which is a UE-specific set up for an individual ACTIVE UE upon a request initiated by the UE and then maintained for the UE when the UE is staying in either ACTIVE or INACTIVE state) at least some certain contexts of the common PDU session are preconfigured to all relevant UEs and maintained regardless of the states the relevant UEs are in. The rest of the contexts of the common PDU session can be cell-specific and/or UE-specific, as the common PDU session is activated by the serving network.

Furthermore, the contexts of the common PDU session are extended to include pre-defined contents or data packets, also referred to as test data or test packets, to be exchanged between the UE and the network according to a pre-defined traffic pattern for the common PDU session when being activated. In this connection, the main reasons include the following. First, the massive QoS monitoring is not specific to an individual UE but a certain service area consisting of one or more cells, thus involving one or more gNBs and a plural of relevant UEs in the targeted service area. Second, the massive QoS monitoring is for on-the-fly adaptive service provisioning and adjustment and therefore not necessarily limited to only some of those active UEs which are currently operating the targeted applications and services.

In addition, according to at least some exemplary embodiments, the common PDU session, specific to the on-the-fly massive QoS monitoring considered herein, consists of predefined QoS flows in downlink (DL) for feedforward from the network and corresponding QoS flows in uplink (UL) for feedback from individual involved UEs in order to enable the network to perform the actual QoS monitoring of at least one of the targeted E2E KPIs. Thus, there is a predefined mapping between a DL QoS flow and a UL QoS flow or, that is, if an involved UE receives a packet of a DL QoS flow, then the UE will be able to determine and send a packet of a corresponding UL QoS flow back to the network.

Further, according to various exemplary embodiments, the contents of DL packets and UL packets sent on pre-defined QoS flows of the common PDU session are also predefined, referred to as test packets. The predefined QoS flows as well as contents of test packets are specific to associated applications and QoS profiles.

According to at least some exemplary embodiments, the predefined configurations or contexts of the common PDU session, including IDs of the PDU session and all basic QoS flows and QoS profiles, sizes and contents of test packets corresponding to individual QoS flows, mapping between individual DL QoS flows and individual UL QoS flows, etc., are common and can be preconfigured to a User Plane Function (UPF), a Next Generation NodeB (gNBs) and/or UEs which are capable of supporting the on-the-fly massive QoS monitoring in advance, either hardcoded or by on-line configuration and update using common or dedicated control signaling. For example, regarding the static or default contexts of the common PDU session regardless of individual UEs, serving cells or UE states can be hard-coded or provided once-off to individual UEs. Then, cell-specific contexts of the common PDU session may be provided using cell-specific common control signaling such as in a System Information Block (SIB) whereas UE-specific contexts of the common PDU session regarding an individual UE in ACTIVE state may be provided to the UE using dedicated control signaling. The provided cell-specific and UE-specific contexts may add, modify or overwrite some corresponding items or elements of the default contexts.

Furthermore, according to various exemplary embodiments, the network function in control of the QoS monitoring (e.g., enhanced AMF/SMF) may initiate an on-the-fly massive QoS monitoring session by activating the preconfigured common PDU session to involved UPFs, gNBs and UEs for the targeted service area. This activation may come with a setting of all on-the-fly configuration variables, such as which of those preconfigured QoS flows need to be activated, and for how long need to be activated. The activation towards involved UEs can be triggered using either common (using Paging or SIB for examples) or dedicated control signaling (using dedicated Radio Resource Control (RRC) or Non-Access Stratum (NAS) signaling for examples), considering involved UEs may be in idle/inactive or connected/active state when receiving the trigger for the activation of the common PDU session. This allows for reducing signaling overhead as well as proactive deactivation of the common PDU session after the set session lifetime elapses.

According to at least some exemplary embodiments, in case an idle/inactive UE is triggered to be involved in the initiated QoS monitoring session, the UE then upon establishment of the radio connection for the common PDU session may indicate a new cause for the radio connection establishment (and proactive release or deactivation of the common PDU session or individual QoS flow thereof once the preconfigured lifetime of the common PDU session or individual QoS flow elapses). In this case, the serving network may also be able to monitor, e.g., access latency and availability of the targeted application(s) and service(s).

Further, according to various exemplary embodiments, the network entities serving the activated common PDU session (UPF and/or gNB) has full control of how to generate and distribute a test packet in DL to one or more involved UEs using either multicast or unicast, so as to keep overhead controllable as well as to enable QoS monitoring in different network load and with different transmission mode (e.g. multicast or unicast transmission mode). The multicast option may generate high load in UL, depending on how many involved UEs are there on individual cell basis. This is because many UEs may receive the same DL packet and send feedback in UL simultaneously. There can be a coordination between the serving UPF and involved gNB(s) for an optimized distribution of test packets in DL. Namely, for instance, the gNB may be left to be in charge of how to distribute a test packet which is initiated by the serving UPF towards involved UEs. In this case, in addition to sending all the individual UL feedback packets to the serving UPF, the gNB needs to indicate to the UPF about losses of any expected UL feedback packets. The gNB may then determine whether to set up multicast radio bearer (RB) and/or unicast RB to an involved UE. The determination may be e.g. based on cell load, variation of current active data radio bearers (DRBs) for different QoS flows in UL and DL, awareness of UE conditions, etc.

For realizing the proposed massive QoS monitoring as described above, UE, gNB, AMF/SMF and UPF are proposed to be enhanced as will be detailed below. Accordingly, FIG. 3 shows network entities according to at least some exemplary embodiments, in which aspects of the present disclosure are embodied.

Figure 3:
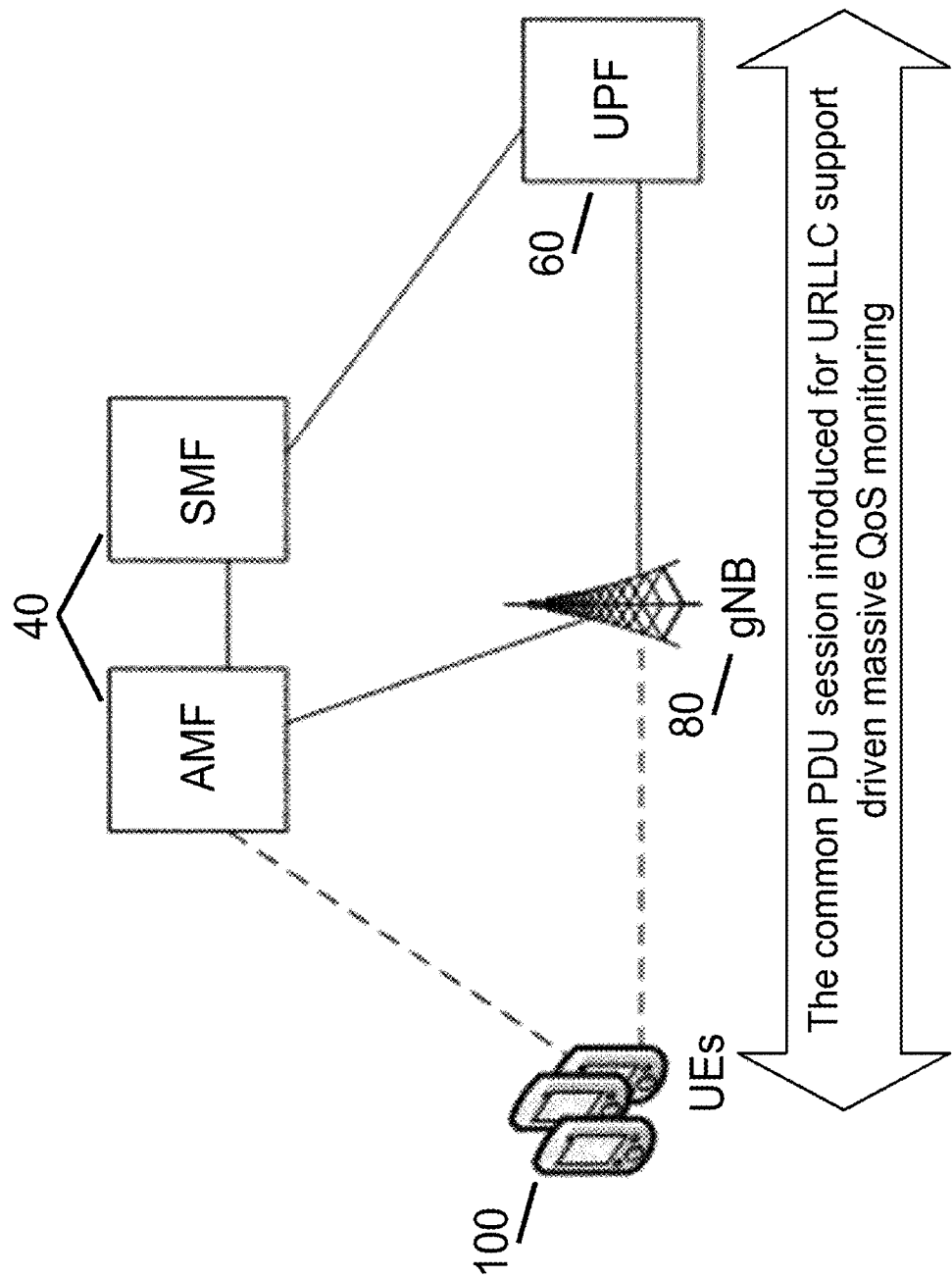
FIG. 3 shows network entities according to at least some exemplary embodiments, in which aspects of the present disclosure are embodied.

Regarding FIG. 3, several devices (network entities and terminal devices) are illustrated, being connected via interfaces. Accordingly, there is an interface between entity AMF/SMF (shown within FIG. 3 as separated entities) and each of the entities UE, gNB, and UPF. The entity UE is further connected to the entity gNB, and the entity gNB is further connected to the entity UPF. The entity AMF/SMF is referred to as first network entity 40 herein below, the entity UPF is referred to as second network entity 60 herein below, the entity gNB is referred to as third network entity 80 herein below, and the entity UE is referred to as terminal device 100 herein below. In user plane, UE, gNB and UPF may originate and/or terminate UL and DL test data for the activated common PDU session as well as perform actual QoS monitoring on the transmitted and received test data—on the radio access level between UE and gNB as well as higher layer level between UE and UPF.

In the following, the devices according to FIG. 3 are defined individually and in more detail.

Figure 4:
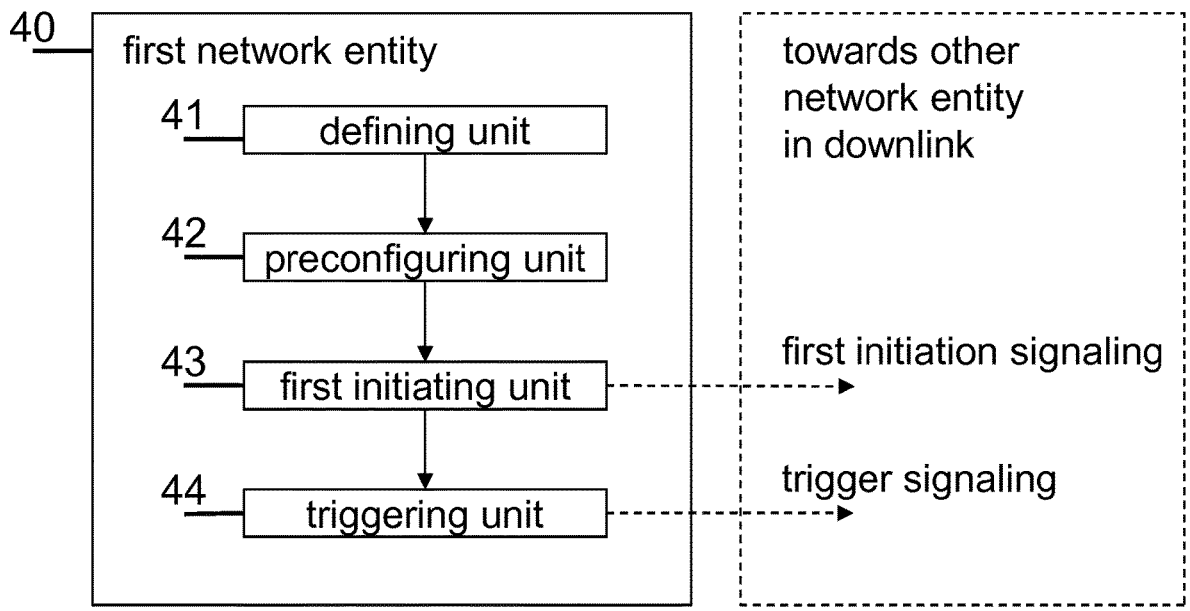
FIG. 4 illustrates a first network entity according to at least some exemplary embodiments.

FIG. 4 is a schematic diagram, illustrating a first network entity 40 according to at least some exemplary embodiments. The first network entity may correspond to an AMF/SMF according to FIG. 3.

In particular, according to FIG. 4, a first network entity 40 is shown, wherein the first network entity 40 comprises a defining unit 41, a preconfiguring unit 42, a first initiating unit 44, and a triggering unit 44. The defining unit 41 is configured to define a common communication session comprising a plurality of contexts, wherein the common communication session is common to a plurality of network entities and terminal devices. The preconfiguring unit 42 is configured to preconfigure the common communication session by preconfiguring at least one context out of the plurality of contexts to be common for more than one network entity out of the plurality of network entities and for more than one terminal device out of the plurality of terminal devices. The first initiating unit 43 is configured to, based on the preconfiguration by the preconfiguring unit 42, initiate the preconfigured common communication session for at least one network entity out of the more than one network entities. The triggering unit 44 is configured to, based on the initiation by the first initiating unit 43, trigger to initiate the preconfigured common communication session for at least one terminal device out of the more than one terminal devices.

Figure 5:
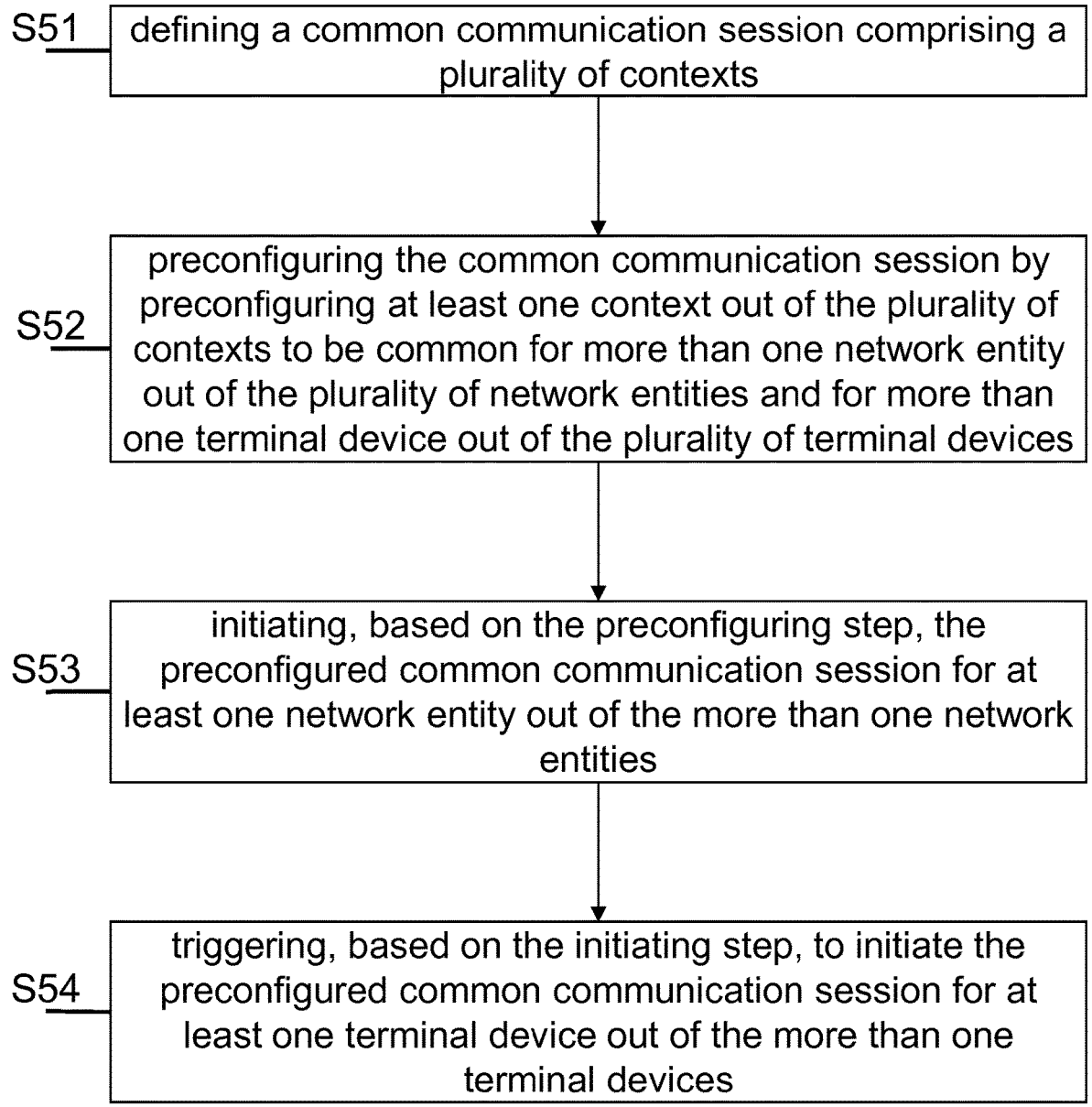
FIG. 5 illustrates a first method according to at least some exemplary embodiments.

FIG. 5 is a flowchart, illustrating a first network entity according to at least some exemplary embodiments. The first network entity 40 according to FIG. 4 may perform the method of FIG. 5 but is not limited to this method. The method of FIG. 5 may be performed by the first network entity 40 of FIG. 4 but is not limited to being performed by this first network entity 40.

In particular, according to FIG. 5, a first method comprises the steps of defining S51 a common communication session comprising a plurality of contexts, wherein the common communication session is common to a plurality of network entities and terminal devices. The first method further comprises preconfiguring S52 the common communication session by preconfiguring at least one context out of the plurality of contexts to be common for more than one network entity out of the plurality of network entities and for more than one terminal device out of the plurality of terminal devices. In addition, the first method comprises initiating S53, based on the preconfiguring step, the preconfigured common communication session for at least one network entity out of the more than one network entities, and triggering S54, based on the initiating step, to initiate the preconfigured common communication session for at least one terminal device out of the more than one terminal devices.

Figure 6:
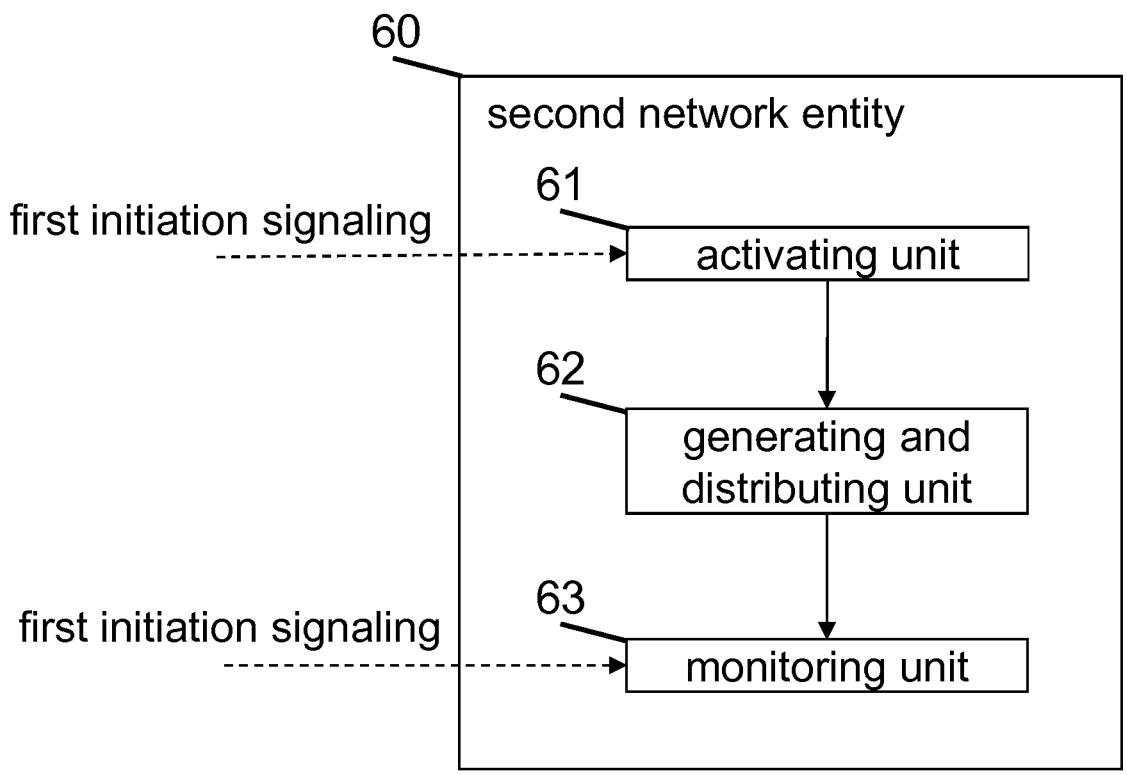
FIG. 6 illustrates a second network entity according to at least some exemplary embodiments.

FIG. 6 is a schematic diagram, illustrating a second network entity 60 according to at least some exemplary embodiments. The second network entity 60 may correspond to a UPF according to FIG. 3.

In particular, according to FIG. 6, the second network entity 60 comprises an activating unit 61, a generating and distributing unit 62, and a monitoring unit 63. The activating unit 61 is configured to activate a preconfigured common communication session based on a control signaling. The generating and distributing unit 62 is configured to, based on the control signaling, generate and distribute a test packet to at least one network entity out of a plurality of network entities and/or to at least one terminal device out of a plurality of terminal devices. The monitoring unit 63 is configured to, based on a first initiation signaling, monitor transmittance of the test packet and response thereto in terms of at least one predetermined performance indicator out of a plurality of predetermined performance indicators.

Figure 7:
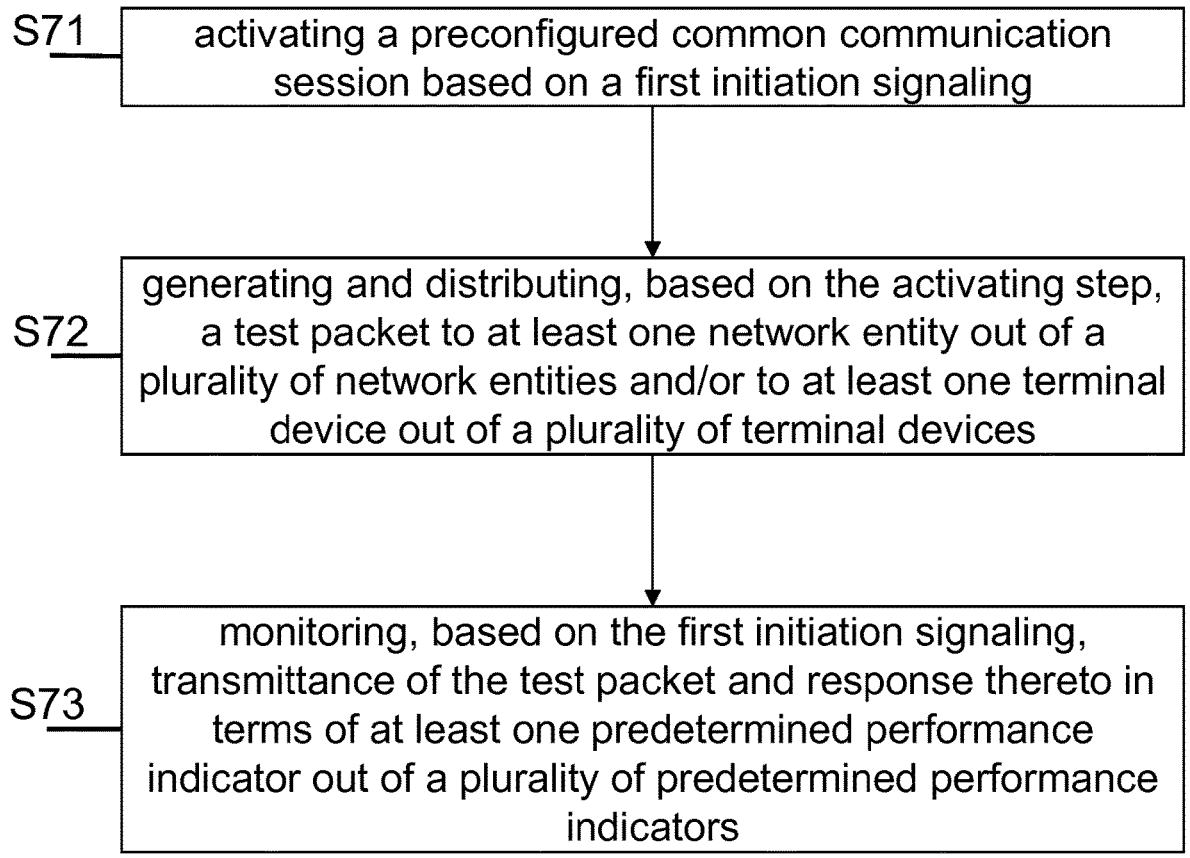
FIG. 7 illustrates a second method according to at least some exemplary embodiments.

FIG. 7 is a flowchart, illustrating a second method according to at least some exemplary embodiments. The second network entity 60 according to FIG. 6 may perform the method of FIG. 7 but is not limited to this method. The method of FIG. 7 may be performed by the second network entity 60 of FIG. 6 but is not limited to being performed by this second network entity 60.

In particular, according to FIG. 7, a second method comprises the steps of activating S71 a preconfigured common communication session based on a first initiation signaling, and generating and distributing S72, based on the activating step, a test packet to at least one network entity out of a plurality of network entities and/or to at least one terminal device out of a plurality of terminal devices. The second method further comprises monitoring S73, based on the first initiation signaling, transmittance of the test packet and response thereto in terms of at least one predetermined performance indicator out of a plurality of predetermined performance indicators.

Figure 8:
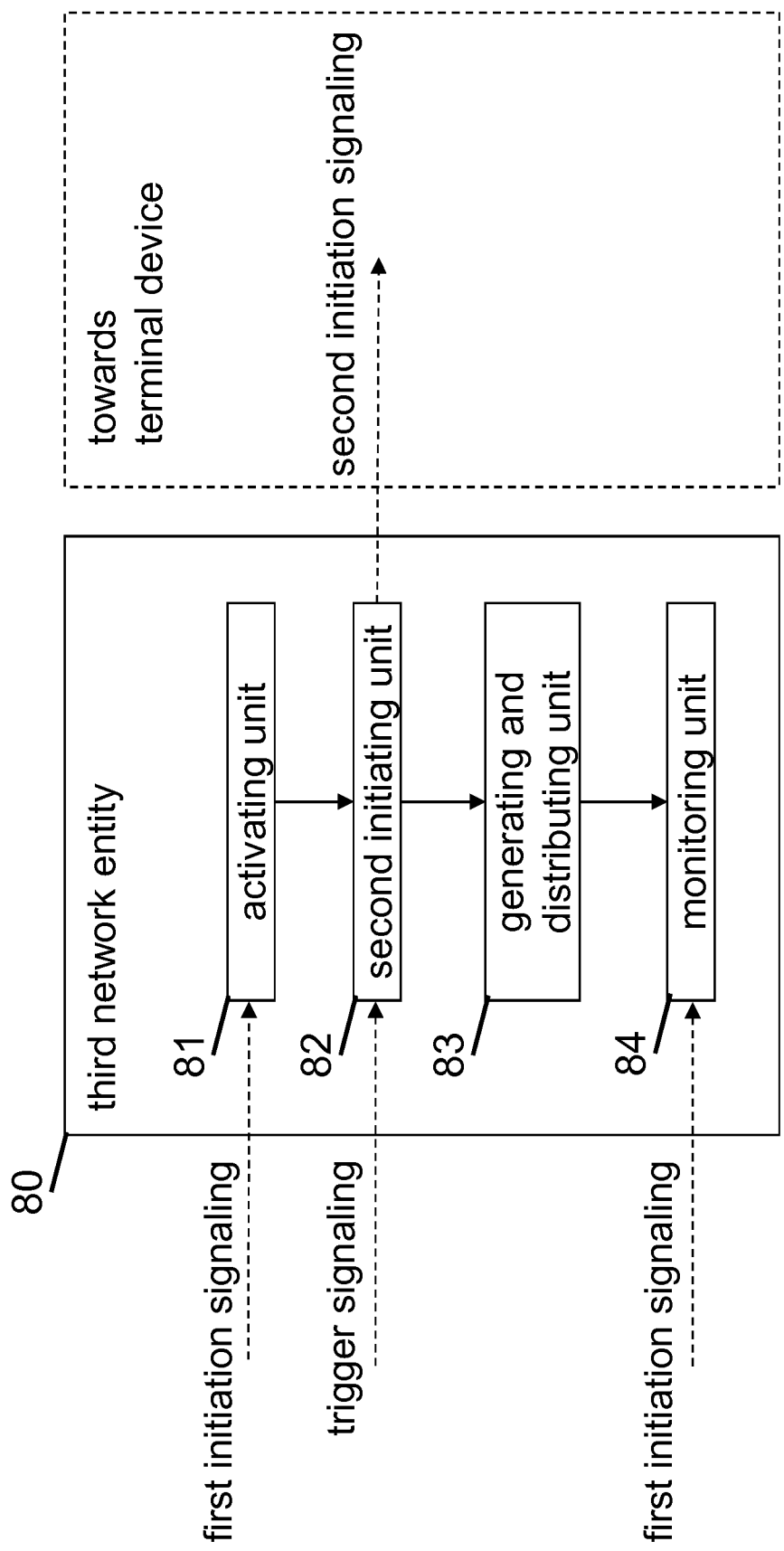
FIG. 8 illustrates a third network entity according to at least some exemplary embodiments.

FIG. 8 is a schematic diagram, illustrating a third network entity 80 according to at least some exemplary embodiments. The third network entity 80 may correspond to a gNB according to FIG. 3.

In particular, according to FIG. 8, the third network entity 80 comprises an activating unit 81, a second initiating unit 82, a generating and distributing unit 83, and a monitoring unit 84. The activating unit 81 is configured to activate a preconfigured common communication session based on a first initiation signaling. The second initiating unit 82 is configured to, based on a trigger signaling, initiate the preconfigured common communication session for at least one terminal device out of a plurality of terminal devices. The generating and distributing unit 83 is configured to, based on the activation by the activating unit 81, generate and distribute a test packet to at least one network entity out of a plurality of network entities and/or to the at least one terminal device. The monitoring unit 84 is configured to, based on the first initiation signaling, monitor transmittance of the test packet and response thereto in terms of at least one predetermined performance indicator out of the plurality of predetermined performance indicators.

Figure 9:
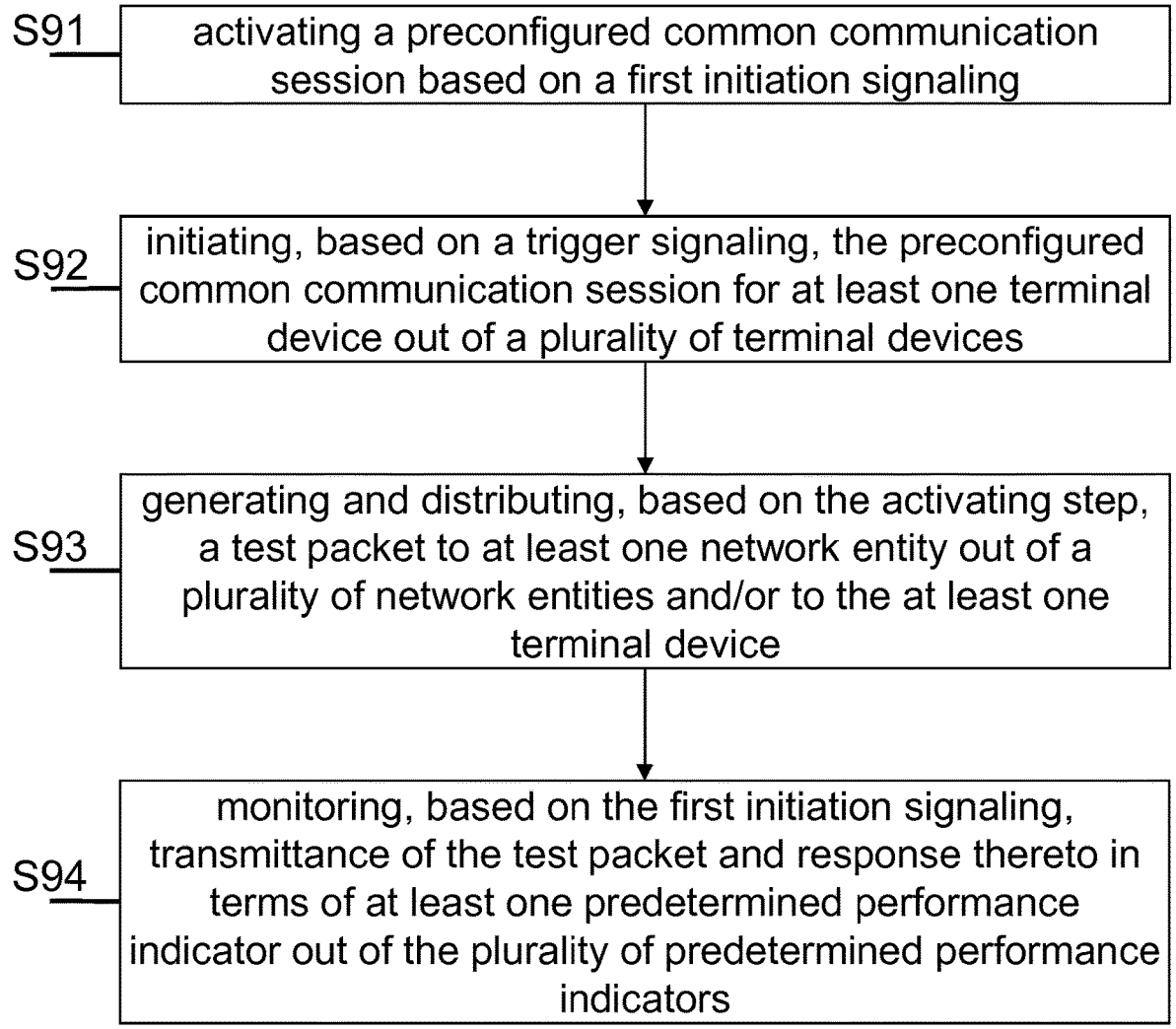
FIG. 9 illustrates a third method according to at least some exemplary embodiments.

FIG. 9 is a flowchart, illustrating a third method according to at least some exemplary embodiments. The third network entity 80 according to FIG. 8 may perform the method of FIG. 9 but is not limited to this method. The method of FIG. 9 may be performed by the third network entity 80 of FIG. 8 but is not limited to being performed by this third network entity 80.

In particular, according to FIG. 9, a third method comprises the steps of activating S91 a preconfigured common communication session based on a first initiation signaling, and initiating S92, based on a trigger signaling, the preconfigured common communication session for at least one terminal device out of a plurality of terminal devices. The third method further comprises generating and distributing S93, based on the activating step, a test packet to at least one network entity out of a plurality of network entities and/or to the at least one terminal device, and monitoring S94, based on the first initiation signaling, transmittance of the test packet and response thereto in terms of at least one predetermined performance indicator out of the plurality of predetermined performance indicators.

Figure 10:
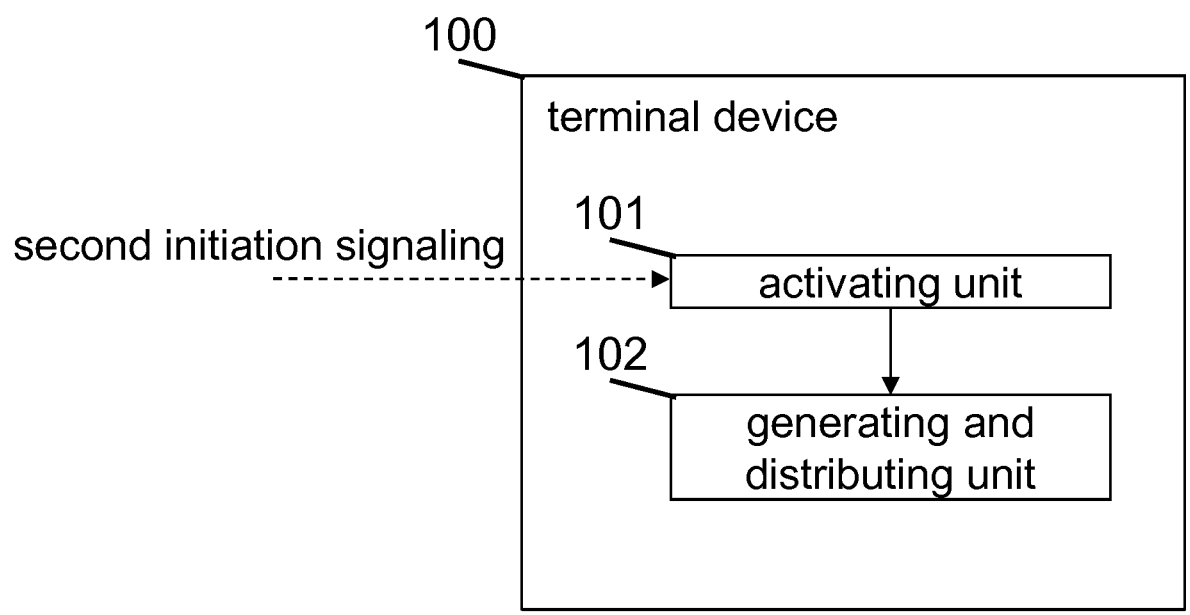
FIG. 10 illustrates a terminal device according to at least some exemplary embodiments.

FIG. 10 is a schematic diagram, illustrating a terminal device 100 according to at least some exemplary embodiments. The terminal device 100 may correspond to a UE according to FIG. 3.

In particular, according to FIG. 10, the terminal device 100 comprises an activating unit 101, and a generating and distributing unit 102. The activating unit 101 is configured to activate a preconfigured common communication session based on a second initiation signaling. The generating and distributing unit 102 is configured to, based on the activation by the activating unit 101, generate and distribute a test packet to at least one network entity out of a plurality of network entities.

Figure 11:
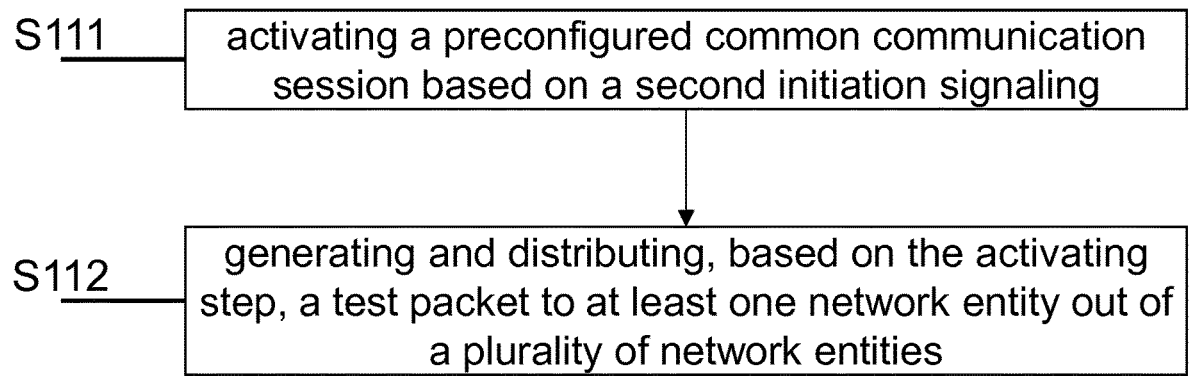
FIG. 11 illustrates a fourth method according to at least some exemplary embodiments.

FIG. 11 is a flowchart, illustrating a fourth method according to at least some exemplary embodiments. The terminal device 100 according to FIG. 10 may perform the method of FIG. 11 but is not limited to this method. The method of FIG. 11 may be performed by the terminal device 100 of FIG. 10 but is not limited to being performed by this terminal device 100.

In particular, according to FIG. 11, a fourth method comprises the steps of activating S111 a preconfigured common communication session based on a second initiation signaling, and generating and distributing S112, based on the activating step, a test packet to at least one network entity out of a plurality of network entities.

Regarding FIG. 3, it is to be noted that any one of the first network entity 40 (according to FIG. 4), the second network entity 60 (according to FIG. 6), the third network entity 80 (according to FIG. 8), and the terminal device 100 (according to FIG. 10) may be used in any combination thereof. However, neither one of the first network entity 40, the second network entity 60, the third network entity 80, and the terminal device 100 is limited to being used in any combination thereof.

Furthermore, in various embodiments, at least some of the functionalities of any one of the first network entity 40, the second network entity 60, the third network entity 80, and the terminal device 100 may be shared between two physically separate devices forming one operational device. Thus, any one of the first network entity 40, the second network entity 60, the third network entity 80, and the terminal device 100 may be seen to depict the operational device comprising one or more physically separate devices for executing at least some of the described processes.

In the following, further exemplary embodiments are described. However, these exemplary embodiments may also be valid in relation with the aforementioned devices, methods, and/or systems.

According to various exemplary embodiments, regarding the first network entity 40, the preconfiguring unit 42 is further configured to use hard code or on-line configuration to preconfigure the at least one context.

In addition, according to at least some exemplary embodiments, the first network entity 40 may further comprise a controlling unit configured to maintain the at least one preconfigured context regardless of the state of the at least one terminal device out of the more than one terminal devices.

Furthermore, according to various exemplary embodiments, the first network entity 40 may further comprise a controlling unit configured to maintain the at least one preconfigured context regardless of a state of the at least one terminal device out of the more than one terminal devices;

and/or to update the preconfigured at least one context u^^sing common or dedicated control signaling.

Further, according to various exemplary embodiments, regarding the first network entity 40, the first initiating unit 43 may further be configured to initiate, for at least one network entity out of the more than one network entities, monitoring activities, wherein the monitoring activities may comprise to monitor transmittance of data and response thereto in terms of at least one predetermined performance indicator out of the plurality of predetermined performance indicators.

According to at least some exemplary embodiments, regarding the first network entity 40, the first initiating unit 43 may further be configured to initiate, for at least one network entity out of the more than one network entities, on-the-fly massive Quality of Service monitoring based on at least one predetermined performance indicator out of a plurality of predetermined performance indicators, wherein the plurality of predetermined performance indicators comprises end-to-end key performance indicators for URLLC support over Uu.

Additionally, according to at least some exemplary embodiments, the at least one preconfigured context may include predefined test data and/or predefined test packets, specific to associated applications and/or Quality of Service profiles.

According to various exemplary embodiments, the monitored at least one predetermined performance indicator out of the plurality of predetermined performance indicators may comprise an end-to-end key performance indicator for URLLC support over Uu.

Furthermore, according to various exemplary embodiments, the at least one preconfigured context out of the plurality of contexts of the common communication session may include predefined test data and/or predefined test packets, specific to associated applications and/or Quality of Service profiles.

In addition, according to at least some exemplary embodiments, the at least one preconfigured context may be hard-coded or on-line configured.

Further, according to various exemplary embodiments, the plurality of contexts exclusive the at least one preconfigured context may be specific for one network entity out of the plurality of network entities and/or for one terminal device out of the plurality of terminal devices.

Furthermore, according to at least some exemplary embodiments, the common communication session may be a common PDU session.

Additionally, according to at least some exemplary embodiments, the common communication session may consist of predefined Quality of Service flows in downlink for feedforward from the at least one network entity out of the more than one network entities and/or the at least one terminal device out of the more than one terminal devices, and of corresponding Quality of Service flows in uplink for feedback from the at least one network entity out of the more than one network entities and/or the at least one terminal device out of the more than one terminal devices. The predefined Quality of Service flows may be specific to associated applications and/or Quality of Service profiles.

Furthermore, according to various exemplary embodiments, regarding the second network entity 60, the generating and distributing unit 62 may further be configured to generate and distribute the test packet by using either multicast or unicast.

Further, according to various exemplary embodiments, regarding the second network entity 60, the generating and distributing unit 62 may further be configured to be in coordination with a generating and distributing unit corresponding to the at least one network entity and/or to the at least one terminal device.

In addition, according to at least some exemplary embodiments, regarding the third network entity 80, the second initiating unit 82 may further be configured to initiate, for the at least one network entity, monitoring activities, wherein the monitoring activities may comprise to monitor transmittance of data and response thereto in terms of at least one predetermined performance indicator out of the plurality of predetermined performance indicators Additionally, according to at least some exemplary embodiments, regarding the third network entity 80, the generating and distributing unit 83 may further be configured to generate and distribute the test packet by using either multicast or unicast.

In addition, according to various exemplary embodiments, regarding the third network entity 80, the generating and distributing unit 83 may further be configured to be in coordination with a generating and distributing unit corresponding to the at least one network entity and/or to the at least one terminal device.

Further, according to at least some exemplary embodiments, the terminal device 100 may further comprise a monitoring unit configured to, based on the second initiation signaling, monitor transmittance of the test packet and response thereto in terms of at least one predetermined performance indicator out of a plurality of predetermined performance indicators.

Furthermore, according to various exemplary embodiments, the terminal device 100 may further be configured to comprise a determining unit configured to determine, based on a state of the terminal device 100, if to participate in the preconfigured common communication session and/or if to monitor transmittance of the test packet and response thereto.

In addition, according to at least some exemplary embodiments, a system is defined, wherein the system may comprise the third network entity 80 and a plurality of terminal devices 100, wherein at least one out of the plurality of terminal devices 100 corresponds at least to the third network entity 80.

Figure 12:
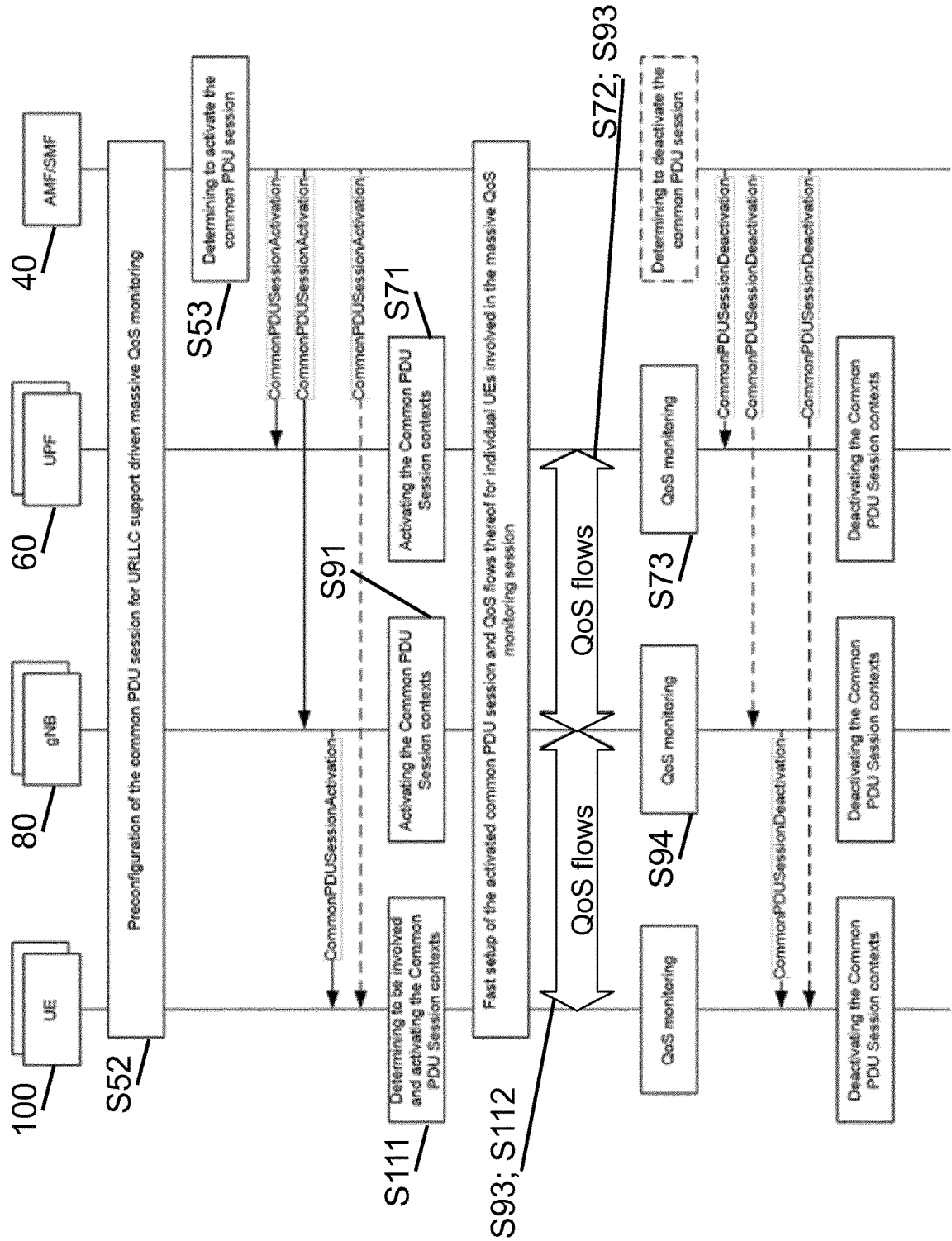
FIG. 12 illustrates signaling flows according to at least some exemplary embodiments.

After the detailed description of the individual devices according to FIG. 3, FIG. 12 now illustrates signaling flows according to at least some exemplary embodiments. Regarding FIG. 12, relevant entities are arranged horizontally, subsequent process steps are arranged vertically, control signaling are presented by arrows, and individual processes are presented by filled boxes/double-arrows. It is to be noted that a terminal device 100 (UE) may be configured to determine whether it needs to be involved or not in the initiated massive QoS monitoring. For example, in case a, in which CommonPDUSessionActivation is initiated using common signaling, a terminal device 100 (UE) which is not relevant may ignore the request and therefore may not be involved. Further, according to another example, a relevant UE which is in ACTIVE state, thus having ongoing QoS flows with the same QoS levels as that indicated in a CommonPDUSessionActivation, may also ignore the request.

For the fast setup step to be found in FIG. 12, as a common PDU session context is preconfigured to all relevant network entities such as a second network entity 60 (UPF), a third network entity 80 (gNB) and a plurality of terminal devices 100 (UEs), the activation of a common PDU session and QoS flows procedure can be rather fast and requires only limited signaling to indicate a PDU session ID, activated QoS flows to be monitored, and optional lifetime of an activated common PDU session.

It is further noted that, according to at least some exemplary embodiments, for how to transmit test packets for different activated QoS flows in the user-plane according to FIG. 3 between a second network entity 60 (UPF), a third network entity 80 (gNB) and a terminal devices 100 (UE), using either unicast or multicast, single-connectivity or multi-connectivity for open-loop or close-loop E2E is assumed by using existing mechanisms specified for URLLC support.

Thus, according to various exemplary embodiments, basically, on-the-fly massive Quality of Service monitoring is enabled.

The above-described procedures and functions may be implemented by respective functional elements, processors, or the like, as described below.

In the foregoing exemplary description of the network entities and/or terminal devices, only the units that are relevant for understanding the principles according to at least some embodiments have been described. The network entities and/or terminal devices may comprise further units that are necessary for its respective operation. However, a description of these units is omitted in this specification. The arrangement of the units of the network entities and/or terminal devices is not construed to limit the disclosure, and the functions may be performed by one unit or further split into sub-units.

When in the foregoing description it is stated that the network entity and/or terminal device (or some other circuitry/means) is configured to perform some function, this is to be construed to be equivalent to a description stating that a (i.e. at least one) processor, potentially in cooperation with computer program code stored in a memory of the respective network entity and/or terminal device, is configured to cause the network entity and/or terminal device to perform at least the thus mentioned function. Also, such function is to be construed to be equivalently implementable by specifically configured means for performing the respective function (i.e. the expression "unit configured to" is construed to be equivalent to an expression such as "means for").

For the purpose of various exemplary embodiments as described herein above, it should be noted that method steps likely to be implemented as software code portions and being run using a processor at a network server or network entity (as examples of network entities and/or terminal devices modules thereof, or as examples of entities including devices and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices or circuitries likely to be implemented as hardware components at the above-defined network entities and/or terminal devices, or any module(s) thereof, are hardware independent and can be implemented using any known or future developed hardware technology or any hybrids of these;

devices or circuitries can be implemented as individual devices or circuitries, but this does not exclude that they are implemented in a distributed fashion throughout the system, as long as the functionality of the device or circuitry is preserved.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of various exemplary embodiments. Network entities and/or terminal devices can be implemented as individual devices, but this does not exclude that they are implemented in a distributed fashion throughout the system, as long as the functionality of the device is preserved. Such and similar principles are to be considered as known to a skilled person.

Various exemplary embodiments also covers any conceivable combination of method steps and operations described above, and any conceivable combination of network entities and/or terminal devices described above, as long as the above-described concepts of methodology and structural arrangement are applicable.

Even though according to at least some embodiments described above with reference to the examples according to the accompanying drawings, it is to be understood that the at least some embodiments are not restricted thereto. Rather, it is apparent to those skilled in the art that various exemplary embodiments can be modified in many ways without departing from the scope of the inventive idea as disclosed herein.

In view of the above, there is provided a first network entity, comprising a defining unit configured to define a common communication session comprising a plurality of contexts, wherein the common communication session is common to a plurality of network entities and terminal devices, a preconfiguring unit configured to preconfigure the common communication session by preconfiguring at least one context out of the plurality of contexts to be common for more than one network entity out of the plurality of network entities and for more than one terminal device out of the plurality of terminal devices, a first initiating unit configured to, based on the preconfiguration by the preconfiguring unit, initiate the preconfigured common communication session for at least one network entity out of the more than one network entities, and a triggering unit configured to, based on the initiation by the first initiating unit, trigger to initiate the preconfigured common communication session for at least one terminal device out of the more than one terminal devices.

LIST OF ACRONYMS AND ABBREVIATIONS

5GS 5th Generation System
AF Application Function
AMBR Aggregate Maximum Bit Rate
AMF Access Mobility & Management Function
CN Core Network
CoR Category of Requirement
DL downlink
DN Data Network
DRB Data Radio Bearer
E2E End-to-End
eV2X enhanced Vehicle-to-Everything
gNB Next Generation NodeB
IIoT Industrial Internet of Things
KPI Key Performance Indicator
LoA Level of Automation
MDT Minimizing Device Test
NAS Non-Access Stratum
SM Session Management
NR New Radio
PDU Protocol Data Unit
QoS Quality of Service
RAN Radio Access Node
RB Radio Bearer
RRC Radio Resource Control
SIB System Information Block
SMF Session Management Function
SSC Session and Service Continuity
UE User Equipment
UL uplink
UPF User Plane Function
URLLC Ultra-Reliable Low Latency Communication
V2X Vehicle-to-Everything

What is claimed is:

1. A first network entity, comprising:
a defining unit configured to define a common communication session comprising a plurality of contexts, wherein the common communication session is common to a plurality of network entities and terminal devices,
a preconfiguring unit configured to preconfigure the common communication session by preconfiguring at least one context out of the plurality of contexts to be common for more than one network entity out of the plurality of network entities and for more than one terminal device out of the plurality of terminal devices,
a first initiating unit configured to, based on the preconfiguration by the preconfiguring unit, initiate the preconfigured common communication session for at least one network entity out of the more than one network entities,
a triggering unit configured to, based on the initiation by the first initiating unit, trigger to initiate the preconfigured common communication session for at least one terminal device out of the more than one terminal devices, and
a controlling unit configured to maintain the at least one preconfigured context regardless of a state of the at least one terminal device,
wherein the first initiating unit is further configured to initiate, for the at least one network entity, monitoring activities, wherein the monitoring activities comprise monitoring transmittance of data and response thereto in terms of at least one predetermined performance indicator out of a plurality of predetermined performance indicators, wherein the plurality of predetermined performance indicators comprises end-to-end key performance indicators for URLLC support over Uu.

2. The first network entity according to claim 1, wherein the preconfiguring unit is further configured to use hard code or on-line configuration to preconfigure the at least one context.

3. The first network entity according to claim 1, wherein the controlling unit is further configured to update the preconfigured at least one context using common or dedicated control signaling.

4. The first network entity according to claim 1, wherein the first initiating unit is further configured to initiate, for the at least one network entity, Quality of Service monitoring based on at least one predetermined performance indicator out of the plurality of predetermined performance indicators.

5. The first network entity according to claim 1, wherein
the at least one preconfigured context includes predefined test data and/or predefined test packets, specific to associated applications and/or Quality of Service profiles; and/or
the at least one preconfigured context is hardcoded or on-line configured; and/or the plurality of contexts exclusive the at least one preconfigured context is specific for one network entity out of the plurality of network entities and/or for one terminal device out of the plurality of terminal devices; and/or
the common communication session is a common PDU session; and/or the common communication session consists of
predefined Quality of Service flows in downlink for feedforward from the at least one network entity out of the more than one network entities and/or the at least one terminal device out of the more than one terminal devices, and
of corresponding Quality of Service flows in uplink for feedback from the at least one network entity out of the more than one network entities and/or the at least one terminal device out of the more than one terminal devices,
wherein the predefined Quality of Service flows are specific to associated applications and/or Quality of Service profiles.

6. A first method, comprising:
defining a common communication session comprising a plurality of contexts, wherein the common communication session is common to a plurality of network entities and terminal devices,
preconfiguring the common communication session by preconfiguring at least one context out of the plurality of contexts to be common for more than one network entity out of the plurality of network entities and for more than one terminal device out of the plurality of terminal devices,
initiating, based on the preconfiguring step, the preconfigured common communication session for at least one network entity out of the more than one network entities,
triggering, based on the initiating step, to initiate the preconfigured common communication session for at least one terminal device out of the more than one terminal devices,
maintaining the at least one preconfigured context regardless of a state of the at least one terminal device out of the more than one terminal devices, and
initiating monitoring activities for the at least one network entity out of the more than one network entities, wherein the monitoring activities comprise monitoring transmittance of data and response thereto in terms of at least one predetermined performance indicator out of a plurality of predetermined performance indicators, wherein the plurality of predetermined performance indicators comprises end-to-end key performance indicators for URLLC support over Uu.

7. A second network entity, comprising:
an activating unit configured to activate a preconfigured common communication session based on a first initiation signaling,
a generating and distributing unit configured to, based on the activation by the activating unit, generate and distribute a test packet to at least one network entity out of a plurality of network entities and to at least one terminal device out of a plurality of terminal devices, and
a monitoring unit configured to, based on the first initiation signaling, monitor transmittance of the test packet and response thereto in terms of at least one predetermined performance indicator out of a plurality of predetermined performance indicators,
wherein the generating and distributing unit is further configured to generate and distribute the test packet by using unicast; and the generating and distributing unit is further configured to be in coordination with a generating and distributing unit corresponding to the at least one network entity and/or to the at least one terminal device.

8. A second method, comprising:
activating a preconfigured common communication session based on a first initiation signaling,
generating and distributing, based on the activating step, a test packet to at least one network entity out of a plurality of network entities and/or to at least one terminal device out of a plurality of terminal devices, and
monitoring, based on the first initiation signaling, transmittance of the test packet and response thereto in terms of at least one predetermined performance indicator out of a plurality of predetermined performance indicators,
wherein the generating and distributing generates and distributes the test packet by using unicast and the generating and distributing is in coordination with a generating and distributing unit corresponding to the at least one network entity and/or to the at least one terminal device.

9. A third network entity, comprising:
an activating unit configured to activate a preconfigured common communication session based on a first initiation signaling,
a second initiating unit configured to, based on a trigger signaling, initiate the preconfigured common communication session for at least one terminal device out of a plurality of terminal devices,
a generating and distributing unit configured to, based on the activation by the activating unit, generate and distribute a test packet to at least one network entity out of a plurality of network entities and/or to the at least one terminal device, and
a monitoring unit configured to, based on the first initiation signaling, monitor transmittance of the test packet and response thereto in terms of at least one predetermined performance indicator out of a plurality of predetermined performance indicators,
wherein the second initiating unit is further configured to initiate, for the at least one network entity, monitoring activities, wherein the monitoring activities comprise monitoring transmittance of data and response thereto in terms of the at least one predetermined performance indicator, and
wherein the plurality of predetermined performance indicators comprises end-to-end key performance indicators for URLLC support over Uu.

10. The third network entity according to claim 9, wherein the generating and distributing unit is further configured to be in coordination with a generating and distributing unit corresponding to the at least one network entity and/or to the at least one terminal device.

11. A third method, comprising:
activating a preconfigured common communication session based on a first initiation signaling,
initiating, based on a trigger signaling, the preconfigured common communication session for at least one terminal device out of a plurality of terminal devices,
generating and distributing, based on the activating step, a test packet to at least one network entity out of a plurality of network entities and/or to the at least one terminal device, and
monitoring, based on the first initiation signaling, transmittance of the test packet and response thereto in terms of at least one predetermined performance indicator out of the plurality of predetermined performance indicators,
initiating monitoring activities for the at least one network entity, wherein the monitoring activities comprise monitoring transmittance of data and response thereto in terms of the at least one predetermined performance indicator, and
wherein the plurality of predetermined performance indicators comprises end-to-end key performance indicators for URLLC support over UU.

12. A terminal device, comprising:
an activating unit configured to activate a preconfigured common communication session based on a second initiation signaling,
a generating and distributing unit configured to, based on the activation by the activating unit, generate and distribute a test packet to at least one network entity out of a plurality of network entities,
a monitoring unit configured to, based on the second initiation signaling, monitor transmittance of the test packet and response thereto in terms of at least one predetermined performance indicator out of a plurality of predetermined performance indicators, and
a determining unit configured to determine, based on a state of the terminal device, whether to participate in the preconfigured common communication session and/or whether to monitor transmittance of the test packet and response thereto,
wherein the plurality of predetermined performance indicators comprises end-to-end key performance indicators for URLLC support over Uu.

13. A fourth method, comprising:
activating a preconfigured common communication session based on a second initiation signaling,
generating and distributing, based on the activating step, a test packet to at least one network entity out of a plurality of network entities,
monitoring, based on the second initiation signaling, transmittance of the test packet and response thereto in terms of at least one predetermined performance indicator out of a plurality of predetermined performance indicators, and
determining, based on a state of a terminal device, whether to participate in the preconfigured common communication session and/or whether to monitor transmittance of the test packet and response thereto,
wherein the plurality of predetermined performance indicators comprises end-to-end key performance indicators for URLLC support over Uu.

* * * * *